(12) United States Patent
van der Lely et al.

(10) Patent No.: US 6,481,372 B2
(45) Date of Patent: Nov. 19, 2002

(54) CONSTRUCTION FOR AUTOMATICALLY MILKING ANIMALS

(75) Inventors: Alexander van der Lely, Rotterdam (NL); Karel van den Berg, Bleskensgraaf (NL); Renatus Ignatius Josephus Fransen, Vlaardingen (NL)

(73) Assignee: Lely Research Holding A.G., Zug (CH)

( * ) Notice: Subject to any disclaimer, the term of this patent is extended or adjusted under 35 U.S.C. 154(b) by 0 days.

(21) Appl. No.: 09/901,092

(22) Filed: Jul. 10, 2001

(65) Prior Publication Data

US 2002/0040683 A1 Apr. 11, 2002

(30) Foreign Application Priority Data

Jul. 10, 2000 (NL) .............................................. 1015673

(51) Int. Cl.[7] ................................. A01J 3/00; A01J 5/00
(52) U.S. Cl. .................................. 119/14.08; 119/14.01
(58) Field of Search ........................... 119/14.01, 14.08, 119/14.02, 140.03, 14.14

(56) References Cited

U.S. PATENT DOCUMENTS 5,918,566 A * 7/1999 van den Berg .......... 119/14.02
5,957,081 A * 9/1999 van der Lely et al. .... 119/14.09
6,213,051 B1 * 4/2001 Fransen .................... 119/14.01

* cited by examiner

Primary Examiner—Charles T. Jordan
Assistant Examiner—Judith A. Nelson
(74) Attorney, Agent, or Firm—Penrose Lucas Albright

(57) ABSTRACT

An apparatus for the automated milking of animals such as cows in a milking compartment with a milking robot which is provided with a controllable robot arm for supporting and connecting teat cups to the teats of an animal in the milking compartment to be milked. The milking compartment is provided with a guide element for guiding movement of the robot arm. The guide element is so configured that the robot arm when moving along the guide element pivots the robot arm about a substantially vertical axis so that the teat cups are pivoted between a first position which is out of reach of the animal to be milked in the milking compartment to a second position located under the animal's udder. The mechanical guide element preferably includes a gear teeth arrangement whereby there is a gear type meshed connection between rollers that support the robot arm and the guide element to provide a robust mechanism and accurate pivoting movement by the robot arm.

26 Claims, 1 Drawing Sheet

CONSTRUCTION FOR AUTOMATICALLY MILKING ANIMALS

FIELD OF THE INVENTION

The invention relates to an apparatus for automatically milking animals in a milking compartment with a milking robot that has a controllable arm for moving the teat cups under the animal to be milked in the milking compartment and connecting the teat cups to the teats of the animal to be milked.

BACKGROUND OF THE INVENTION

With known apparatuses, prior to connecting the teat cups, a controllable robot arm pivots under the udder of the animal to be milked to position the teat cups there. For this purpose, known apparatuses are often provided with a freely movable electronically controlled robot arms. This has, inter alia, the disadvantage that the robot arm is sensitive to operational failures.

SUMMARY OF THE INVENTION

An object of the invention is to provide a mechanical guide element for the robot arm to follow which causes the teat cups to follow a path that takes them from outside of the milking compartment to a position wherein the teat cups are under the teats of an animal in the milking compartment. The use of the mechanical guide element for a pivoting movement, which is each time substantially the same, results in a very robust and reliable milking robot. The guide element enables an accurate pivoting movement of the robot arm.

BRIEF DESCRIPTION OF THE DRAWINGS

The invention will now be explained in further detail with reference to the accompanying figures.

DETAILED DESCRIPTION OF THE PREFERRED EMBODIMENTS

Figure 2:
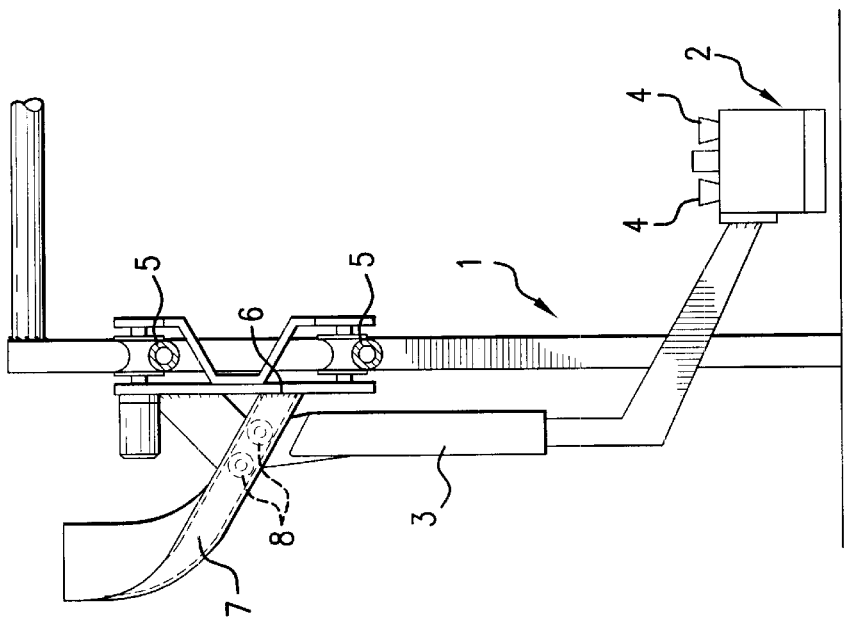
FIG. 2 shows schematically the apparatus of FIG. 1 as seen from the direction of the arrow II in said figure.
Figure 1:
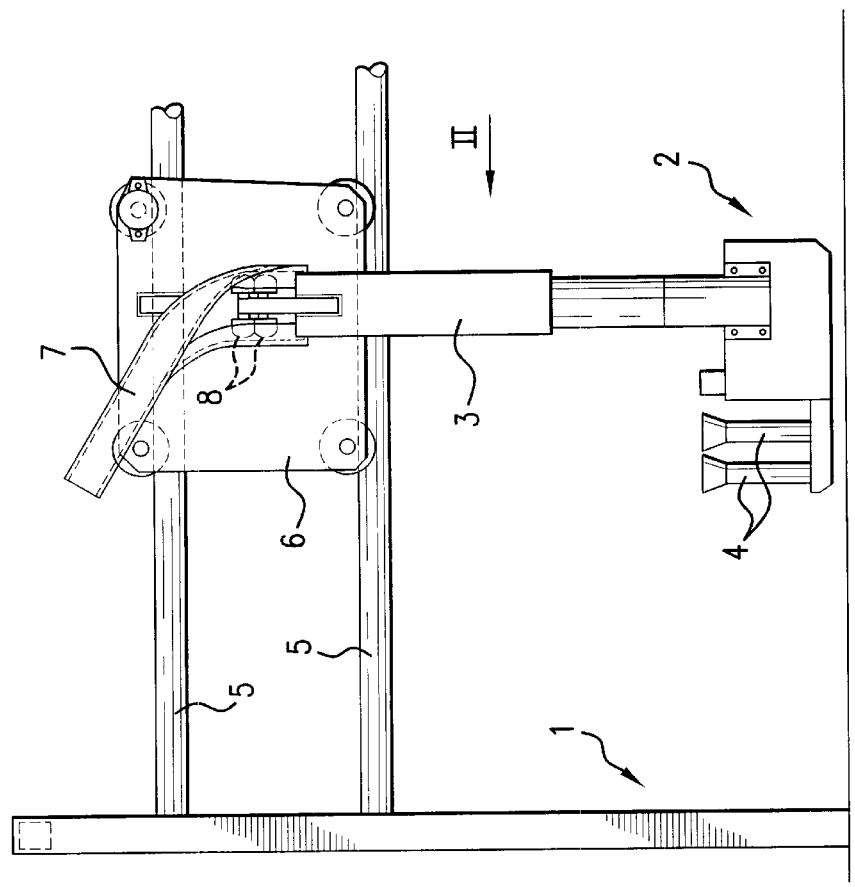
FIG. 1 shows schematically a side view of a part of the apparatus according to the invention.

FIG. 1 shows schematically a part of the apparatus according to the invention. This apparatus for automatically milking animals comprises a milking compartment 1 with a milking robot 2 which is well known to those skilled in the art and is provided with a controllable robot arm 3 for connecting teat cups 4 to the teats of an animal that is to be milked in milking compartment 1.

Robot arm 3 can be moved in the longitudinal direction of milking compartment 1 with the aid of control means appropriate therefor, such as rail construction 5 and a suspension element 6 that is movable along said rail construction. Of course, the control means may also be different, such as, for example, a parallelogram construction, a telescoping construction, a piston and cylinder construction or a hingeable construction. As shown, however, construction 5 comprises two superposed, parallel, tubular rails, along which suspension element 6, equipped with four wheels, can be moved.

A guide element 7 for robot arm 3 is fitted to suspension element 6. Said guide element 7 is formed as a curve so that robot arm 3 when moving along guide element 7 pivots teat cups 4 between a first position beyond reach of the animal to be milked and a second position under the udder of that animal. For accurate positioning of teat cups 4 in transverse direction under the animal to be milked, the curved path of guide element 7 is configured to permit the positioning in various further positions under the udder.

Robot arm 3 is movable along guide element 7 with the aid of a drivable pulling element, such as a chain or a cable, that is connected to milking compartment 1. In the embodiment shown, robot arm 3 is movable along guide element 7 with the aid of drivable wheels 8 that are connected with robot arm 3. Of course, alternative roller elements are possible as well. Viewed in cross-section, guide element 7 has a curved shape which is configured so that at its lower side a running surface for wheels 8 is formed. During the pivoting movement, the upper part of robot arm 3, that is fastened to wheels 8, extends through a groove in the lower side of guide element 7. Wheels 8 or the guide element 7 or both are preferably provided with gear teeth.

The lower part of robot arm 3 is movable in vertical direction with the aid of control means appropriate therefor. Said control means are shown as a telescoping construction, but may of course also be designed differently, such as a parallelogram construction, a piston and cylinder construction or a hingeable construction.

Although we have disclosed the preferred embodiments of our invention, it is to be understood that it is capable of other adaptations and modifications within the scope of the following claims.

Having thus disclosed our invention, what we claim as new and to be secured by Letters Patent of the United States of America is:

1. A construction for automatically milking animals, said construction comprising a milk box (1) with a milking robot (2), which is provided with a controllable robot arm (3) for connecting teat cups (4) to the teats of an animal to be milked, characterized in that the milk box (1) is provided with a guide element (7) for the robot arm (3), said guide element (7) having such a shape that the robot arm (3) when moving along the guide element (7) pivots the teat cups (4) between a first position beyond the reach of the animal to be milked and at least one second position under the udder of the animal to be milked.

2. A construction as claimed in claim 1, characterized in that the robot arm (3) is movable along the guide element (7) with the aid of a drivable pulling element, such as a chain or a cable, that is connected with the milk box (1).

3. A construction as claimed in claim 1, characterized in that the robot arm (3) is movable along the guide element (7) with the aid of at least one drivable wheel (8) and/or roller element that is connected with the robot arm (3).

4. A construction as claimed in claim 3, characterized in that the wheel (8) and/or roller element and/or the guide element (7) are/is provided with a toothing.

5. An apparatus for automatically milking animals which comprises: a milking compartment; a milking robot operatively associated with said milking compartment; teat cups; a controllable robot arm included in said milking robot for connecting said teat cups to an animal being milked in said milking compartment; a guide element on said milking compartment that provides pivotal movement of said robot arm about an upright axis relative to said milking compartment whereby said robot arm is pivotable in said guide element from a first position beyond the reach of an animal in said milking compartment to a second position under the udder of an animal to be milked in said milking compartment.

6. An Apparatus in accordance with claim 5 which comprises a drivable pulling element which interconnects said milking compartment and said robot arm whereby said robot arm is movable on said guide element by means of said drivable pulling element.

7. An apparatus in accordance with claim 6 wherein said drivable pulling element comprises a chain.

8. An apparatus in accordance with claim 6 wherein said drivable pulling element comprises a cable.

9. An apparatus in accordance with claim 5 which comprises a drivable wheel by means of which said robot arm is movable on said guide element.

10. An apparatus in accordance with claim 5 which comprises a robot element connected to said robot arm for moving said robot arm along said guide element.

11. An apparatus in accordance with claim 5 comprising meshing gear teeth in said guide element and in said robot arm.

12. An apparatus in accordance with claim 5 wherein teeth and spaces to be received by said teeth provide a movable interconnection between said robot arm and said guide element.

13. An apparatus in accordance with claim 5 wherein said robot arm comprises control means for moving part of said robot arm in a substantially vertical direction.

14. An apparatus in accordance with claim 13 wherein said control means comprises a parallelogram construction.

15. An apparatus in accordance with claim 13 wherein said control means comprises a telescoping construction.

16. An apparatus in accordance with claim 13 wherein said control means comprises a piston and cylinder construction.

17. An apparatus in accordance with claim 13 wherein said control means comprises a hingeable construction.

18. An apparatus in accordance with claim 5 which comprises horizontal positioning means supported on said milking compartment, said robot arm being supported by said horizontal positioning means and movable thereon in a longitudinal direction relative to said milking compartment.

19. An apparatus in accordance with claim 5 wherein said milking compartment comprises guiding means and said milking robot comprises a suspension element that is movable along said guiding means.

20. A apparatus in accordance with claim 19 wherein said guiding-means comprises a rail construction.

21. An apparatus in accordance with claim 5 which comprises a parallelogram means that connects said robot arm to said milking compartment so that said robot arm is movable substantially in an horizontal direction relative to said milking compartment.

22. An apparatus in accordance with claim 5 comprising movement means for controlling the movement of said robot arm in a longitudinal direction relative to said milking compartment.

23. An apparatus in accordance with claim 22 wherein said movement means comprises telescoping means.

24. An apparatus in accordance with claim 22 wherein said movement means comprises a piston and cylinder combination.

25. An apparatus in accordance with claim 22 wherein said movement means includes hingeable means.

26. An apparatus for automatically milking animals which comprises: a milking compartment; teat cups; a controllable robot arm for connecting said teat cups to an animal being milked in said milking compartment; and a curved guide element on said milking compartment that provides pivotal movement of said robot arm about an upright axis relative to said milking compartment whereby said robot arm is pivotable in said guide element from a first position beyond the reach of an animal in said milking compartment to a second position under the udder of an animal to be milked in said milking compartment.

* * * * *